(12) United States Patent
Stier et al.

(10) Patent No.: US 6,619,269 B1
(45) Date of Patent: Sep. 16, 2003

(54) FUEL INJECTOR

(75) Inventors: Hubert Stier, Asperg (DE); Guenther Hohl, Stuttgart (DE); Norbert Keim, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 09/890,292

(22) PCT Filed: Nov. 23, 2000

(86) PCT No.: PCT/DE00/04142

§ 371 (c)(1),
(2), (4) Date: Nov. 2, 2001

(87) PCT Pub. No.: WO01/38722

PCT Pub. Date: May 31, 2001

(30) Foreign Application Priority Data

Nov. 27, 1999 (DE) .......................... 199 57 172

(51) Int. Cl.[7] .......................... F02M 51/00; F02M 41/00
(52) U.S. Cl. ........................ 123/490; 123/467
(58) Field of Search ................. 123/490, 467, 123/497, 499, 472; 239/585.1, 585.3, 585.5, 600; 251/129.15

(56) References Cited

U.S. PATENT DOCUMENTS

| | | | |
|---|---|---|---|
| 5,730,091 A | 3/1998 | Miller et al. | |
| 5,775,599 A * | 7/1998 | Smith et al. | 239/585.3 |
| 5,975,055 A | 11/1999 | Matsuda et al. | |
| 5,979,786 A * | 11/1999 | Longman et al. | 239/5 |
| 6,170,767 B1 * | 1/2001 | Herold et al. | 239/585.3 |
| 6,510,841 B1 * | 1/2003 | Stier | 123/472 |
| 6,523,759 B1 * | 2/2003 | D'Arrigo | 239/585.1 |

FOREIGN PATENT DOCUMENTS

| | | |
|---|---|---|
| DE | 196 26 576 | 1/1998 |
| DE | 197 23 405 | 12/1998 |
| FR | 2 373 689 | 7/1978 |

\* cited by examiner

*Primary Examiner*—Mahmoud Gimie
(74) *Attorney, Agent, or Firm*—Kenyon & Kenyon

(57) ABSTRACT

A fuel injector for fuel injection systems of internal combustion engines, in particular for the direct injection of fuel into a combustion chamber of an internal combustion engine, includes a solenoid coil, an armature that is acted upon in a closing direction by a resetting spring, and a valve needle that is in a form-locking connection with the armature for actuating a valve-closure member, which together with a valve seat surface forms a sealing seat. A cooperates with the resetting spring such that the spring forces of the resetting spring and of the are added together. In this context, the resetting spring is biased over a total lift of the armature and the is biased only over a residual lift of the armature, which is smaller than the total lift.

15 Claims, 4 Drawing Sheets

FUEL INJECTOR

FIELD OF THE INVENTION

The present invention relates to a fuel injector.

BACKGROUND INFORMATION

German Patent Application No. 196 26 576 describes an electromagnetically actuatable fuel injector for directly injecting fuel into the combustion chamber of an internal combustion engine. In the fuel injector, for the purpose of electromagnetic actuation, an armature cooperates with an electrically excitable solenoid coil, and the lift of the armature is transmitted via a valve needle to a valve-closure member. The valve-closure member cooperates with a valve seat surface to form a sealing seat. Resetting the valve needle and the valve-closure member is accomplished using a resetting spring.

Especially disadvantageous in the fuel injector described in German Patent Application No. 196 26 576 are relatively long closing times. Delays in closing the fuel injector are caused by the adhesion forces operating between the armature and the internal pole and by the non-instantaneous subsiding of the magnetic field when the excitation current is switched off. Therefore, the resetting spring must have a large spring constant, i.e., a large biasing. To achieve shorter closing times, the resetting force must be dimensioned significantly greater than would be necessary for sealing off the combustion chamber pressures. This necessitates high power requirements for the electronic drive circuit.

SUMMARY

The fuel injector according to the example embodiment of the present invention has the advantage that an additional cutoff spring acts positively both on the opening as well as on the closing process. The opening process is accelerated by the lesser spring force of the resetting spring, which makes possible lower drive power levels. In the closing process, an additional acceleration force is made available by the additional , so as to close the fuel injector rapidly. The spring constant of the resetting spring is dimensioned such that the spring force exerted is still quite sufficient to seal the fuel injector against the pressure in the combustion chamber of the internal combustion engine. In response to the cutoff, the rapid acceleration of the valve needle is taken over by the , which is dimensioned at a larger spring constant than the resetting spring. In the opening motion, the is biased in only a relatively short partial lift. Since, when this partial lift is completed, the maximum magnetic force is already built up, the opening motion is only delayed by the to an insignificant extent.

The variable configuration of the is advantageous, which is not limited to spiral springs, but can also be executed as planar or sleeve-shaped disk springs. Using a disk spring has the advantage of a sloping force curve.

Also advantageous is the simple manufacture and assembly of the components, which make no special demands on the material or on the manufacturing process.

DETAILED DESCRIPTION

Figure 1:
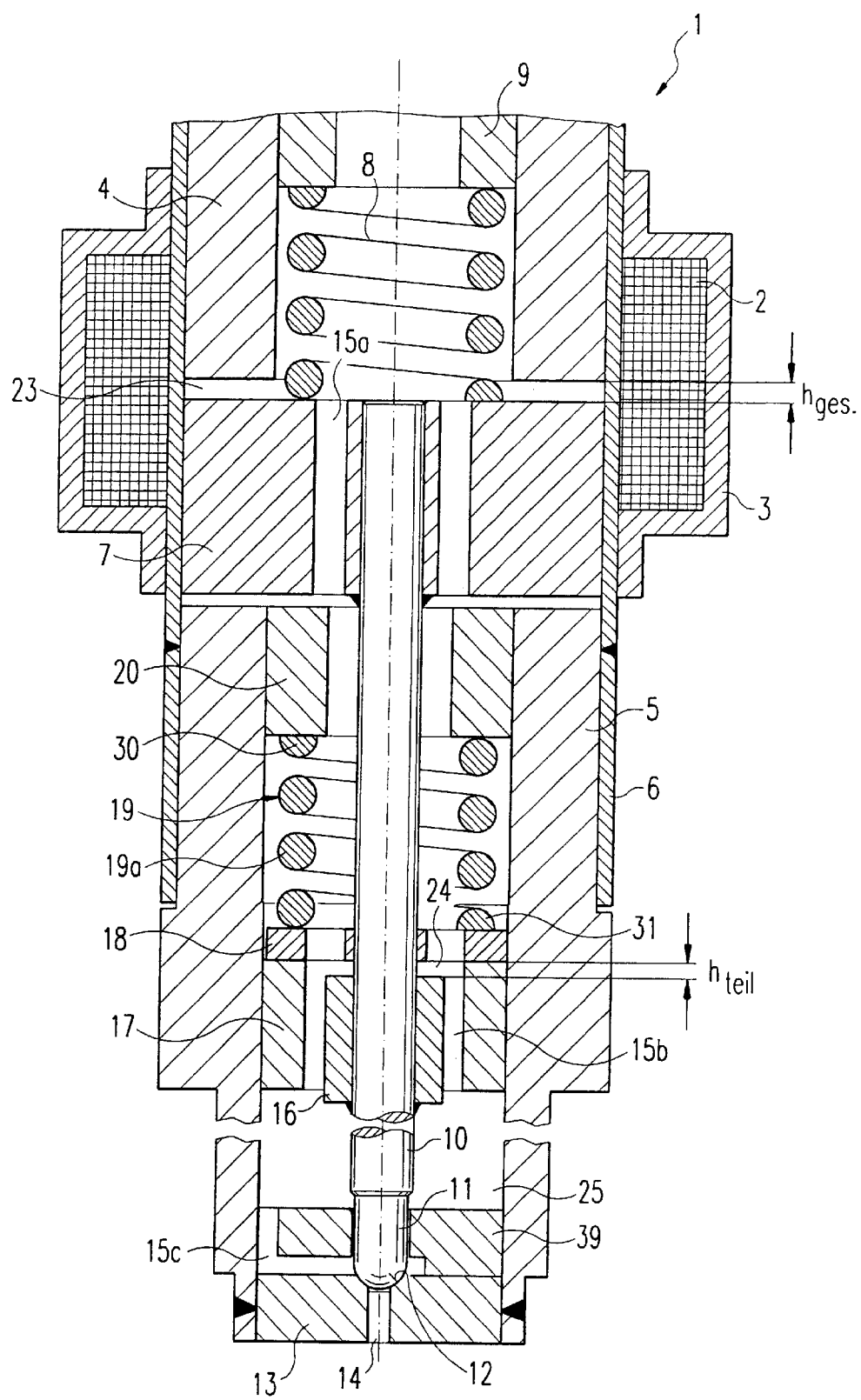
FIG. 1 in a sectional view depicts a first exemplary embodiment of a fuel injector according to the present invention.

FIG. 1, in an axial sectional view, depicts the spray-discharge-side area of a fuel injector 1. A fuel injector 1 functions to directly inject fuel into a combustion chamber (not shown) of a spark-ignited, mixture-compressing internal if combustion engine, and it is executed as an inward-opening fuel injector 1. Fuel injector 1 includes a solenoid coil 2, which is surrounded by a magnetic return body 3, as well as an internal pole 4, and an external pole 5, which is surrounded by a sleeve-shaped valve housing 6. Between internal pole 4 and external pole 5, an armature 7 is arranged, which is acted upon by the resetting spring 8. Resetting spring 8 contacts at its end face an adjusting sleeve 9, which biases (prestresses) resetting spring 8. Armature 7 is connected in a form-locking manner to a valve needle 10, at whose spray-discharge end a valve-closure member 11 is configured. Valve-closure member 11 along with valve seat surface 12 creates a sealing seat. In a valve seat member 13, at least one spray-discharge opening 14 is configured. Valve needle 10 is guided in a guide body 39.

The fuel is conveyed centrally and is directed via fuel channels 15a, 15b, 15c to the sealing seat.

Welded to valve needle 10 is a tubular valve needle stop 16. An axially movable ring 18, through which valve needle 10 extends, is situated on a foundation 17, which can be pressed, in particular, into a central recess 25 of fuel injector 1, the foundation being mounted on the inner wall of external pole 5. Supported on ring 18 is a 19, which is biased by spring adjusting ring 20, which is also mounted on the inner wall of external pole 5. Cutoff spring 19 is configured as spiral spring 19a in the first exemplary embodiment, depicted in FIG. 1.

A total lift $h_{ges}$ corresponds to the size of a first working gap 23, which is configured between armature 7 and internal pole 4. A partial lift $h_{teil}$ corresponds to the size of a second working gap 24, which is configured between valve needle stop 16 and movable ring 18. In the present first exemplary embodiment, partial lift $h_{teil}$ amounts to roughly 90% of total lift $h_{ges}$.

If solenoid coil 2 has an electrical excitation current fed to it, a magnetic field is built up which pulls armature 7 in the lift direction towards internal pole 4. Armature 7 takes with it valve needle 10, which is connected to it. While armature 7 and valve needle 10 proceed through partial lift $h_{teil}$, the intensity of the magnetic field has only to overcome the spring force of weakly dimensioned resetting spring 8, so that armature 7 can be accelerated in the direction of internal pole 4. The spring constant of resetting spring 8 is dimensioned such that the spring force is quite sufficient to seal fuel injector 1 against the undepicted combustion chamber of an internal combustion engine. After armature 7 and valve needle 10, which is connected to the former, have gone through roughly 90% of total lift $h_{ges}$, valve needle stop 16 strikes against movable ring 18, which is acted upon by spiral spring 19a. The other 10% of total lift $h_{ges}$ must be gone through in opposition to the spring forces of resetting spring 8 and spiral spring 19a. Spiral spring 19a is compressed by the accelerated motion of armature 7 and valve needle 10 over the remaining roughly 10% of total lift $h_{ges}$. Since the spring forces of resetting spring 8 and spiral spring 19a are added to each other, the total spring force of resetting spring 8 and spiral spring 19a, at the end of the opening process, is available for closing fuel injector 1, the total spring force, as a result of the large spring constant of spiral spring 19a, being significantly greater than the return force achieved in the related art using individual resetting spring 8.

As soon as armature 7 moves in the direction of internal pole 4, valve-closure member 11 lifts off from valve seat surface 12 and fuel is spray-discharged through spray-discharge opening 14.

If the electrical excitation current that is exciting solenoid coil 2 is switched off, the magnetic field dissipates, and armature 7 falls away from internal pole 4. This can happen very rapidly, because the total spring force of resetting spring 8 and spiral spring 19a together accelerate armature 7 in the closing direction, as a result of which valve needle 10 can return very rapidly to its starting position.

Figure 2:
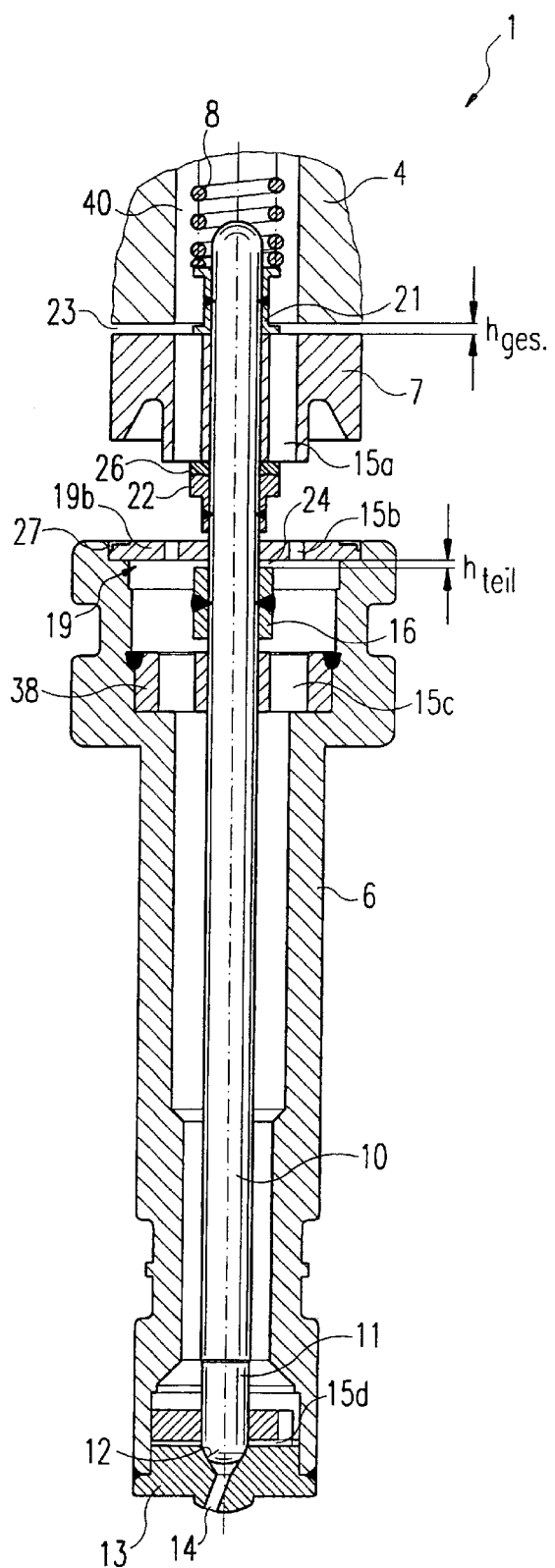
FIG. 2 in a sectional view depicts a second exemplary embodiment of a fuel injector according to the present invention.

FIG. 2, in a partial axial sectional view, depicts a second exemplary embodiment of the configuration of fuel injector 1 according to the present invention. In FIG. 2 only the spray-discharge-side components are depicted. Elements already described are provided with corresponding reference numerals so that a repeat description is largely unnecessary.

The design of fuel injector 1 in the second exemplary embodiment is different from that of the first exemplary embodiment, specifically in the type of 19, which is executed in FIG. 2 as a planar disk spring 19b.

Fuel injector 1 includes a solenoid coil, undepicted in FIG. 2, as well as an internal pole 4, which is surrounded by a valve housing 6. An armature 7, acted upon by resetting spring 8, is arranged in a recess 40 of internal pole 4.

Armature 7, via a sleeve 21, has an operative connection to valve needle 10, at whose spray-discharge end valve-closure member 11 is configured. Valve-closure member 11, together with valve seat surface 12, forms a sealing seat. Configured in valve seat member 13 is at least one spray-discharge opening 14.

Resetting spring 8 is supported on sleeve 21, which is welded to valve needle 10. Sleeve 21 at the same time functions as a driver for armature 7, which in the second exemplary embodiment is not welded to valve needle 10 but rather is axially movable. Armature 7 has at its disposal armature stop 22, arranged on the spray-discharge side, which is configured in a tubular shape and to which valve needle 10 is welded. Between armature 7 and armature stop 22, a ring 26 made of an elastomer material is arranged, which prevents armature 7 from bouncing when fuel injector 1 is closed.

Disk spring 19b is configured in a disk shape and is secured in an annular recession 27 of valve housing 6. Valve needle 10 extends through disk spring 19b and, on the spray-discharge side, a guide element 38, which aids in guiding valve needle 10 and which has fuel channels 15b for conducting the fuel to the sealing seat. A tubular valve needle stop 16 is arranged, preferably being welded, on valve needle 10.

Total lift $h_{ges}$ corresponds to the size of a first working gap 23, which is created between armature 7 and internal pole 4. Partial lift $h_{teil}$ corresponds to the size of second working gap 24, which is created between valve needle stop 16 and disk spring 19b. Partial lift $h_{teil}$ in the present exemplary embodiment also amounts to roughly 90% of total lift $h_{ges}$.

The fuel is supplied centrally and is conveyed via fuel channels 15a, 15b, 15c, 15d to the sealing seat. If the excitation current is supplied to the solenoid coil, undepicted in FIG. 2, then armature 7, as in the previous exemplary embodiment, moves together with valve needle 10 in the lift direction in opposition to the spring force of resetting spring 8, the valve needle, via sleeve 21, being carried with armature 7 through partial lift $h_{teil}$, which amounts to roughly 90% of total lift $h_{ges}$. As soon as valve needle stop 16 makes contact with disk spring 19b, the total spring force of disk spring 19b and resetting spring 8 must be overcome in the remaining partial distance $h_{ges}-h_{teil}$, roughly 10% of total lift $h_{ges}$. Disk spring 19b, however, can be easily deformed by the pre-acceleration of armature 7 and valve needle 10.

Figure 3:
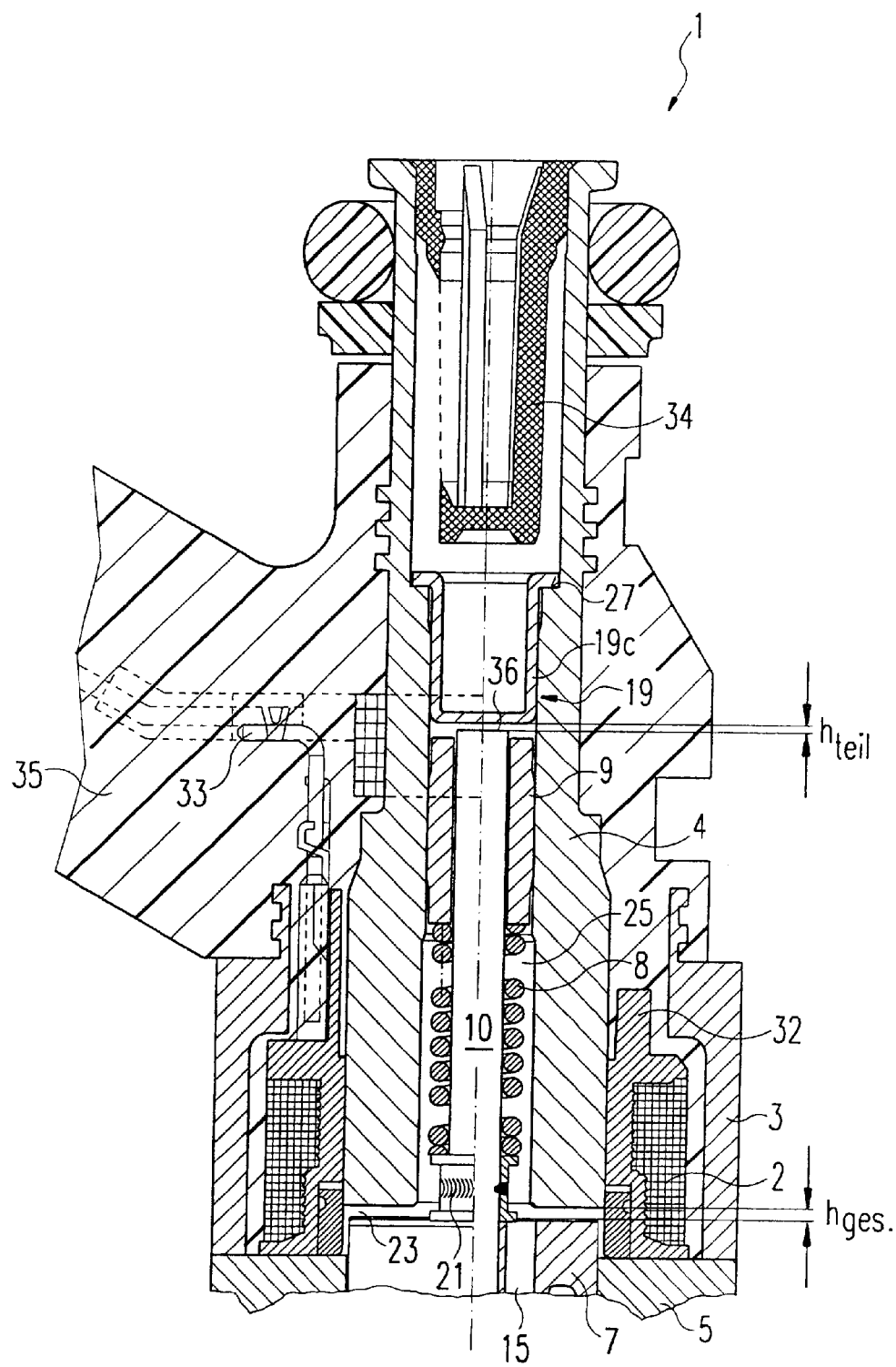
FIG. 3 in a sectional view depicts a third exemplary embodiment of a fuel injector according to the present invention.

FIG. 3, in a partial axial sectional view, depicts a third exemplary embodiment of the configuration of fuel injector 1 according to the present invention. In FIG. 3, only the intake-side components are depicted. The spray-discharge-side part can be configured in a way that is similar to the second exemplary embodiment, but other designs are also possible.

In contrast to the previous exemplary embodiment, in which 19 is arranged in the spray-discharge direction with regard to resetting spring 8, 19 in FIG. 3 is arranged in the intake direction with regard to resetting spring 8. It is configured as a sleeve-shaped disk spring 19c.

Fuel injector 1 includes a solenoid coil 2, which is wound on a spool holder 32. When the electrical excitation current is applied via an electrical line 33, solenoid coil 2 builds up a magnetic field. Armature 7, via sleeve 21, stands in an operative connection to valve needle 10. Supported on sleeve 21 is resetting spring 8, which is biased by adjusting sleeve 9, which is pressed into central recess 25 of internal pole 4. Valve needle 10 extends through resetting spring 8. Joined in the intake-side direction is a sleeve-shaped disk spring 19c, as 19. Sleeve-shaped disk spring 19c is secured in an annular recess 27 of internal pole 4. The fuel is supplied centrally via a filter element 34. The fuel is conveyed to the spray-discharge end of fuel injector 1 via a central recess 25 of fuel injector 1 and via fuel channels 15.

Fuel injector 1 is surrounded by a plastic jacket 35, on which an electrical plug-in contact is injection-molded.

Total lift $h_{ges}$ corresponds to the size of a first working gap 23, which is created between armature 7 and internal pole 4. Partial lift $h_{teil}$ corresponds to the size of the second working gap 24, which is created between one end 36 of valve needle 10 and a sleeve-shaped disk spring 19c. In the present third exemplary embodiment, partial lift $h_{teil}$ also amounts to roughly 90% of total lift $h_{ges}$.

If solenoid coil 2 depicted in FIG. 3 has an electrical excitation current supplied to it via electrical line 33, then a magnetic field is created, which accelerates armature 7 in the lift direction. Valve needle 10 is carried along by sleeve 21. While armature 7 moves through the distance of partial lift $h_{teil}$, the magnetic field must only overcome the spring force of resetting spring 8 in order to accelerate armature 7 in the direction of internal pole 4. As soon as end 36 of valve needle 10 impacts upon sleeve-shaped disk spring 19c, the spring forces of resetting spring 8 and of sleeve-shaped disk spring 19c combine to form an overall spring force which is easily overcome by the pre-acceleration of armature 7. At the end of the opening process of fuel injector 1, a relatively large overall spring force is available for detaching armature 7 from internal pole 4.

Figure 4A:
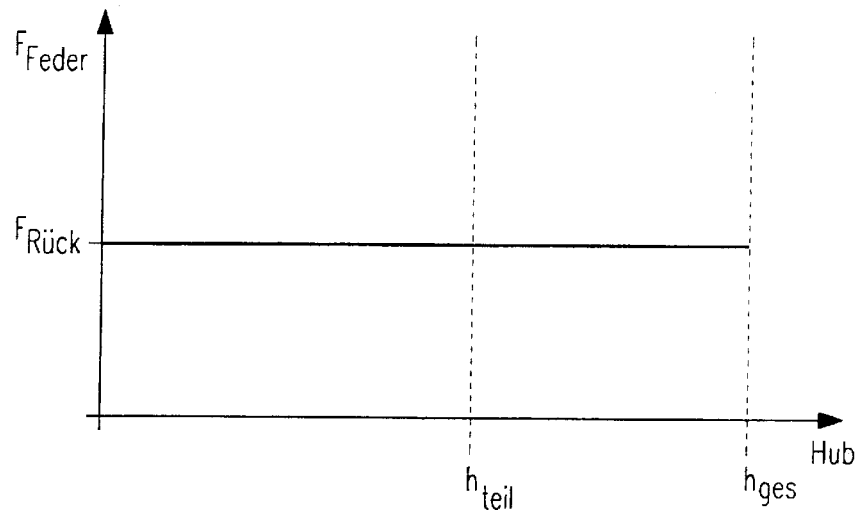
FIGS. 4A–4C depict diagrams of the characteristic curve of the spring force as a function of the lift for the exemplary embodiments of the fuel injector according to the present invention depicted in FIGS. 1 through 3.
Figure 4B:
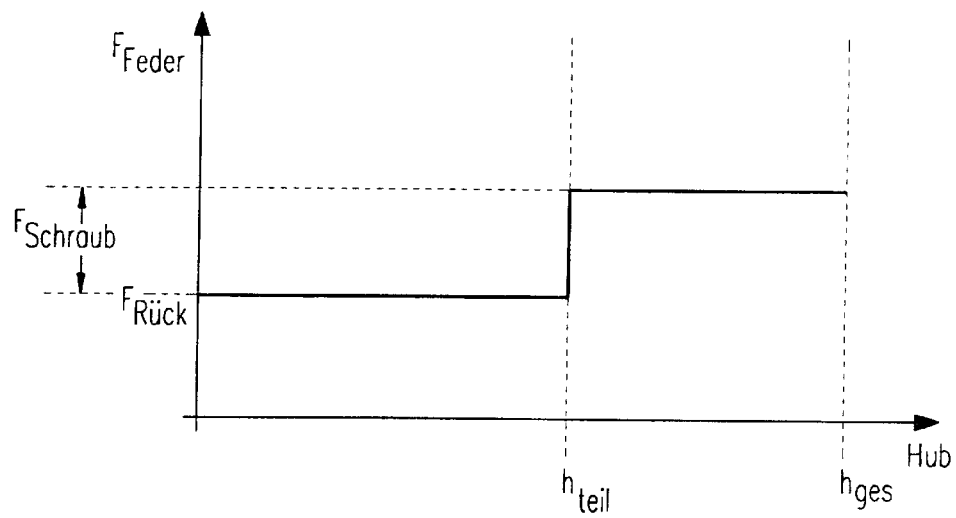
Figure 4C:
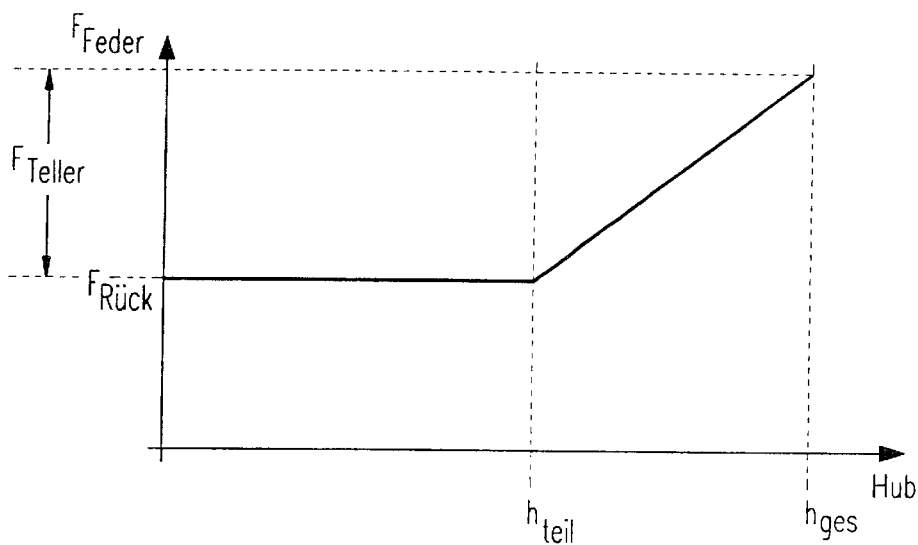

In FIGS. 4A–4C, for illustrating the mode of operation of cutoff spring 19, three diagrams are depicted, in which the correlation between the lift of armature 7 and overall spring force $F_{feder}$ of resetting spring 8 and 19 is depicted.

In FIGS. 4A–4C, the following abbreviations are employed:

$h_{ges}$ total lift $h_{teil}$ partial lift $F_{Feder}$ overall spring force $F_{Rück}$ spring force of resetting spring 8

$F_{Schraub}$ spring force of spiral spring 19a $F_{Teller}$ spring force of disk spring 19b, 19c FIG. 4A illustrates the situation in accordance with the related art. Spring force $F_{Rück}$ remains constant throughout total lift $h_{ges}$, because no further 19 is present. In this context, the distance traveled is so short that spring force $F_{Feder}$ does not noticeably change over total lift $h_{ges}$. The spring force present at the end of the opening process for closing fuel injector 1 is therefore the same as the closing force without the valve needle lift.

FIG. 4B depicts the ratio of forces of the first exemplary embodiment, depicted in FIG. 1. While armature 7 proceeds over partial lift $h_{teil}$, only the spring force of resetting spring $F_{Rück}$ is operative. When valve needle stop 16 strikes against movable ring 18, the magnetic field pulls armature 7, along with valve needle 10, in opposition to overall spring force $F_{Feder}=F_{Rück}+F_{Schraub}$. Spring force $F_{Schraub}$ of spiral spring 19a remains virtually constant due to the relatively small spring constant and the small lift. While armature 7 goes through the remaining lift between $h_{teil}$ and $h_{ges}$, overall spring force $F_{Feder}$ abruptly increases by $F_{Schraub}$, so that at the end of the opening process a higher overall spring force $F_{Feder}$ is available for closing the fuel injector 1 than is depicted in FIG. 4A.

In FIG. 4C, the overall spring force is depicted in accordance with the ratio of forces in FIG. 2 or FIG. 3, when 19 is executed as disk spring 19b or 19c. Because, for deforming disk spring 19b, 19c, a force is required which clearly increases in proportion to the degree of deformation even in the case of a short lift, overall spring force $F_{Feder}$, after valve needle stop 16 contacts disk spring 19b, or end 26 of valve needle 10 contacts disk spring 19c, increases in linear fashion in accordance with the lift, while armature 7 goes through residual lift $h_{ges}-h_{teil}$, so that at the end of the opening process of fuel injector 1 a large overall spring force $F_{Feder}$ is available for closing fuel injector 1.

The increase in the spring force of disk spring 19b, 19c can be adjusted as a result of the different configuration possibilities which influence the hardness and the deformation behavior of disk spring 19b, 19c.

The present invention is not limited to the exemplary embodiments depicted and can also be realized through a multiplicity of different designs of fuel injector 1, in particular in fuel injectors 1 that open to the outside.

What is claimed is:

1. A fuel injector for a fuel injection system of an internal combustion engine, comprising:

a solenoid coil;

a resetting spring;

an armature acted upon in a closing direction by the resetting spring, the solenoid coil being positioned relative to the armature to selectively move the armature;

a cooperating with the resetting spring so that a spring force of the resetting spring and a spring force of the are added together, the resetting spring being biased by the armature over a total lift of the armature, and the being biased by the armature only for a residual lift of the armature, the residual lift being smaller than the total lift.

a valve-closure member;

a valve needle frictionally connected to the armature to actuate the valve-closure member; and a valve seat surface, the valve-closure member and the valve seat forming a sealing seat.

2. The fuel injector according to claim 1, wherein a spring constant of the resetting spring is smaller than a spring constant of the .

3. The fuel injector according to claim 1, wherein the is configured as a spiral spring.

4. The fuel injector according to claim 3, wherein the spiral spring is disposed in an area between the armature and a spray discharge end of the fuel-injector.

5. The fuel injector according to claim 1, further comprising:

a tubular valve needle stop, the valve needle being connected to the tubular valve needle stop.

6. The fuel injector according to claim 5, further comprising:

a fixed spring adjustment ring; and an axially movable ring, the supported at a first end on the fixed adjustment ring and contacts the axially movable ring at a second end.

7. The fuel injector according to claim 6, further comprising:

a fixed support ring, the axially movable ring resting on the fixed support ring.

8. The fuel injector according to claim 7, wherein the valve needle is configured to reach through the spring fixed spring adjustment ring, the and the axially moveable ring.

9. The fuel injector according to claim 8, wherein, in a closed state of the fuel injector, a first working gap is between the armature and a magnetic internal pole, the first working gap being larger than a second working gap that is between the axially movable ring and the tubular valve needle stop.

10. The fuel injector according to claim 1, wherein the is configured as a disk spring.

11. The fuel injector according to claim 10, further comprising:

a valve needle stop connected to the valve needle, the valve needle stop configured to strike against the disk spring.

12. The fuel injector according to claim 11, wherein, in a closed state of the fuel injector, a first working gap is between the armature and a magnetic internal pole, the first working gap being larger than a second working gap that is between the disk spring and the valve needle stop.

13. The fuel injector according to claim 10, wherein the valve needle has a first end that faces away from the valve-closure member, the first end configured to strike against the disk spring.

14. The fuel injector according to claim 13, wherein, in a closed state of the fuel injector, a first working gap is between the armature and a magnetic internal pole, the first working gap being larger than a second working gap located between the first end of the valve needle and the disk spring.

15. The fuel injector according to claim 14, wherein the disk spring is configured in a sleeve shape and is disposed in an area between an intake-side end of the fuel injector and the resetting spring.

* * * * *

UNITED STATES PATENT AND TRADEMARK OFFICE
CERTIFICATE OF CORRECTION

PATENT NO. : 6,619,269 B1
DATED : September 16, 2003
INVENTOR(S) : Stier et al.

It is certified that error appears in the above-identified patent and that said Letters Patent is hereby corrected as shown below:

<u>Title page,</u>
Item [57], ABSTRACT,
Line 8, change "A cooperates" to -- A cutoff spring cooperates --;
Line 10, change "and of the are'" to -- and of the cutoff spring are --.

<u>Column 1,</u>
Line 40, change "the additional," to -- the additional cutoff spring, --
Line 47, change "taken over by the," to -- taken over by the cutoff spring, --
Line 51, change "delayed by the to an" to -- delayed by the cutoff spring to an --
Line 53, change "of the is" to -- of the cutoff spring is, --

<u>Column 2,</u>
Line 37, change "is a 19" to -- is a cutoff spring 19, --

<u>Column 3,</u>
Line 28, change "type of 19," to -- type of cutoff spring 19 --

<u>Column 4,</u>
Line 22, change "which 19 is" to -- which cutoff spring 19 is --
Line 23, change "8, 19 in" to -- 8, cutoff spring 19 in --
Line 35, change "as 19." to -- as cutoff spring 19. --
Line 67, change "8 and 19 is" to -- 8 and cutoff spring 19 is --

<u>Column 5,</u>
Line 11, change "Further 19" to -- Further cutoff spring 19 --
Line 32, change "when 19" to -- when cutoff spring 19 --
Line 60, change "a cooperating with" to -- a cutoff spring cooperating with --

UNITED STATES PATENT AND TRADEMARK OFFICE
CERTIFICATE OF CORRECTION

PATENT NO. : 6,619,269 B1
DATED : September 16, 2003
INVENTOR(S) : Stier et al.

It is certified that error appears in the above-identified patent and that said Letters Patent is hereby corrected as shown below:

<u>Column 6,</u>
Line 9, change "of the." to -- of the cutoff spring. --
Line 10, change "wherein the is" to -- wherein the cutoff spring is --
Line 33, change "the and the" to -- the cutoff spring and the --
Line 40, change "wherein the is" to -- wherein the cutoff spring is --

Signed and Sealed this

Thirtieth Day of November, 2004

JON W. DUDAS
*Director of the United States Patent and Trademark Office*